United States Patent Office 3,761,242
Patented Sept. 25, 1973

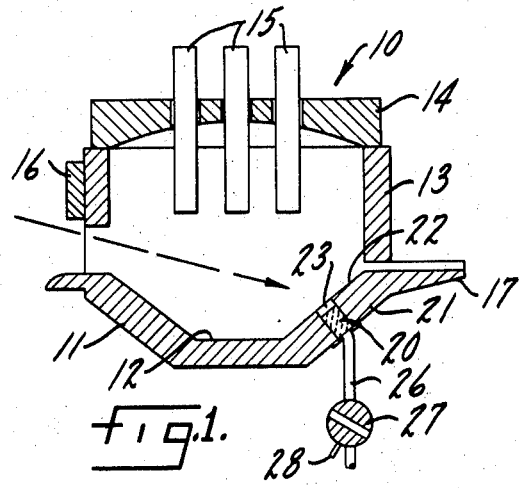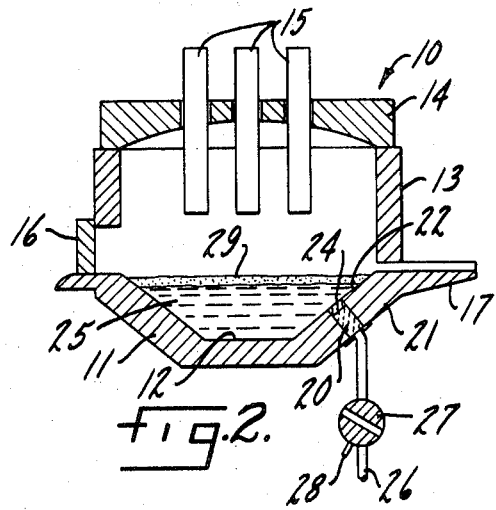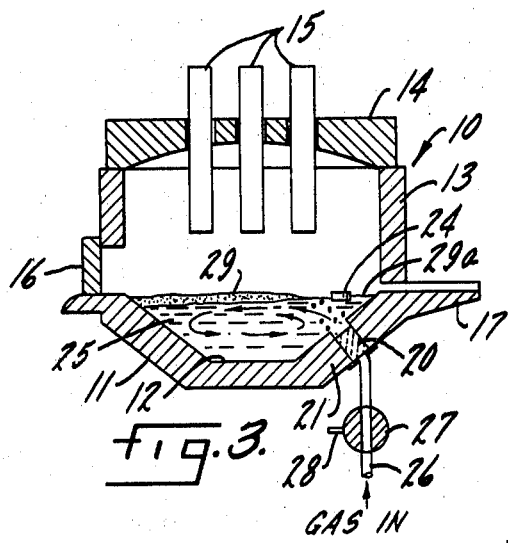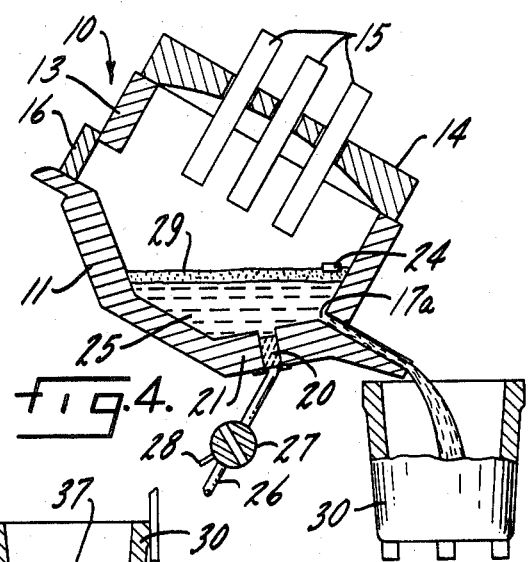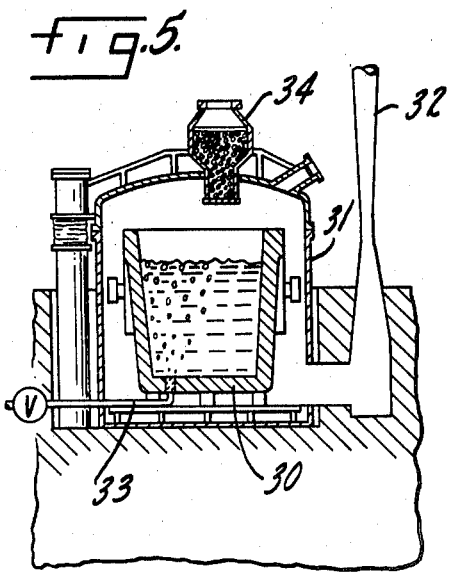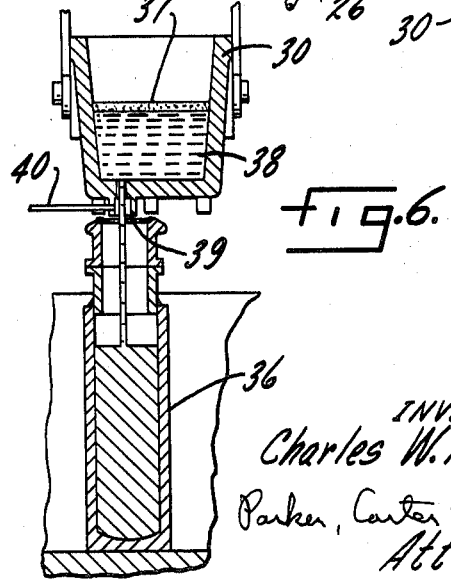
INVENTOR.
Charles W. Finkl,
Parker, Carter + Markey
Attorneys.

3,761,242
METHOD OF TREATING MOLTEN METAL BY GAS PURGING THROUGH A POROUS PLUG
Charles W. Finkl, Evanston, Ill., assignor to A. Finkl & Sons Co., Chicago, Ill.
Continuation-in-part of application Ser. No. 529,311, Feb. 23, 1966, now abandoned, which is a continuation-in-part of application Ser. No. 340,594, Jan. 20, 1964, now Patent No. 3,337,329, which is a continuation-in-part of applications Ser. No. 186,569, Mar. 6, 1962, now Patent No. 3,292,915, and Ser. No. 176,493, Feb. 26, 1962, now Patent No. 3,236,636, which in turn is a continuation-in-part of application Ser. No. 777,664, Dec. 2, 1958, now Patent No. 3,236,635. This application Apr. 30, 1970, Ser. No. 33,282
Int. Cl. C21c 5/52
U.S. Cl. 75—13                3 Claims

ABSTRACT OF THE DISCLOSURE

Steel treating process for lowering gas content of steel in which cycle time is minimized and heat loss eliminated until final portion of the cycle. Steel is pre-degassed by purging under substantially atmospheric pressure and environmental conditions while adding heat, preferably in the melting unit, and then finish degasesd by subjection to a low absolute vacuum.

---

This application is a continuation-in-part of Ser. No. 529,311 filed Feb. 23, 1966, now abandoned, which in turn is a continuation-in-part of Ser. No. 340,594 filed Jan. 20, 1964, now U.S. Pat. No. 3,337,329 which in turn is a continuation-in-part of Ser. No. 186,569 filed Mar. 6, 1962 now U.S. Pat. No. 3,292,915 and Ser. No. 176,493 filed Feb. 26, 1962, now U.S. Pat. No. 3,236,636 which in turn is a continuation-in-part of Ser. No. 777,664 filed Dec. 2, 1968, now U.S. Pat. No. 3,236,635.

This invention relates generally to steel making and specifically to method and apparatus for melting steel, and at least partially refining and degassing the steel in the electric furnace or other melting unit.

In conventional electric furnace practice a charge of solid scrap is placed into the hearth of an electric furnace, an arc established, and the arc maintained until the charge is completely molten and has reached a desired tapping temperature. During the melting process, and generally towards the end thereof, refining operations may be carried out aimed primarily at lowering the sulphur and oxygen content of the steel and adding alloys. Following melting and refining the molten charge is tapped into a ladle. The ladle may then be poured or teemed directly into ingot molds or, as fully disclosed in U.S. Pat. No. 1,236,-635, the ladle may be placed in a separate vacuum degassing system. Since the improvement described in this application is most advantageously practiced in conjunction with a subsequent degassing treatment a short description thereof will be helpful to a full understanding of the invention.

Degassing systems capable of handling anywhere from a few hundred pounds up to several hundred tons of steel are known to the art today. In the type of system illustrated in U.S. Pat. No. 3,236,635 a ladle containing between thirty and forty tons of low alloy electric furnace steel is placed in a vacuum tank within which a vacuum is created by a multi-stage steam ejector system. The steam ejector system must be cut in gradually or the ejector system will be overloaded at the start of the cycle and a shutdown will occur. This is because large volumes of deleterious gases are given off very rapidly at the start of subjection to vacuum, this initial surge of relatively easily removable gases being followed by an appreciable decrease in the rate of gas removal as the remaining, relatively difficult to remove gases are subjected to treatment.

In other words, it is far easier to reduce the hydrogen content from 7 p.p.m. to 6 p.p.m. than from 3 p.p.m. to 2 p.p.m. The same general relationship holds true for oxygen, at least, and possibly nitrogen. Various processes such as carbon deoxidation, which is described in U.S. Pat. No. 3,337,330, may be carried out in the vacuum system. After completion of vacuum treatment the degassed steel is taken to the pouring station where it may be teemed either in atmosphere or under an inert shroud.

Heat loss is an ever present problem to the steel maker who attempts to improve the quality of his product by degassing it. The degassing treatment requires a substantial amount of time between tapping and teeming and experience has shown that even in a vacuum tank the rate of heat loss may be around 7° F. per minute. To combat heat loss the steel maker may either super-heat the molten metal in the furnace or add significant quantities of sensible heat to the molten metal after it leaves the melting unit. Both of these expedients increase the cost of the process, and the first one in particular raises the risk of additional undesirable inclusions being present in the final product, higher oxygen contents in the metal at tap, and shortened furnace refractory life.

Over the years there have been relatively few basic improvements in melting unit practice. Since the problems of one type of unit are fairly common to other types, an electric furnace is chosen for a specific illustration.

Among the problems which are present to a greater or lesser degree today are the problems of stratification and segregation of alloys which are added in the furnace, the existence of a substantial temperature differential between the top and bottom of the charge, and the difficulty of obtaining the desired degree of completion of refining treatments, particularly interface reactions between the metal and the slag.

Furthermore, many experts are currently of the opinion that pouring through the slag is a significant contributing factor to the production of "dirty" steel, and this problem is not completely solved by such expedients as reducing the volume of slag on the surface of the charge just prior to tap.

Accordingly a primary object is to remove the steel making process by shortening the cycle time, thereby lowering the cost and reducing heat loss during the cycle.

Another object is to provide a method and apparatus for shortening the cycle time in a steel making process by simultaneously performing melting unit treatment and additional conditioning steps, which conditioning steps have heretofore been practiced only non-concurrently and generally subsequently to the melting unit treatment steps.

Another object is to provide a method and apparatus for reducing the degassing treatment time between tap and teem by predegassing in the melting unit.

Another object is to provide a method and apparatus for reducing the incidence of undesirable inclusions in the metal resulting from the conventional practice of tapping through the slag.

Yet another object is to provide a method and apparatus for reducing the temperature differential which exists between the upper and lower regions of the charge in a melting unit.

Yet another object is a method and apparatus for reducing, if not eliminating, stratification and segregation of charge materials, including alloy materials which are added in the melting unit.

Another object is to provide a method and apparatus for promoting metal-slag interface reactions in a melting unit.

Another object is to provide a method and apparatus for degassing molten metal which matches the gas removal capabilities of dissimilar gas removal procedures to the variable gas content of molten metal at separate stages in its treatment, thereby increasing the overall efficiency, shortening the cycle time, and reducing cost.

Other objects and advantages of the invention will become apparent from a reading of the following description thereof.

The invention is illustrated more or less diagrammatically in the accompanying figures, each of FIGS. 2 and following representing a subsequent step in the process.

Like reference numerals will be used to refer to like features throughout the following description of the figures.

The melting unit is indicated generally at 10. Although my invention is not confined to any particular type of melting unit it may be best illustrated in connection with a conventional electric arc furnace and such a furnace has been chosen for description. The furnace includes a lower portion 11 within which is formed a hearth 12. Vertical walls are indicated at 13 and a roof or cover at 14. Three conventional electrodes are indicated at 15, said electrodes preferably being spaced 120° apart about a common circle.

A removable furnace door is indicated at 16 and a tapping spout at 17.

By reference to FIG. 2 it will be noted that this conventional furnace has been modified by the addition of means for establishing a circulation within the molten charge for a purpose which will appear hereinafter. Although several possible modes of establishing the circulation might be employed I have chosen for purposes of illustration a purging gas system of the type illustrated in U.S. Pat. No. 3,236,635.

The circulation creating means includes a purging plug 20 which is seated in an appropriately sized recess in the forewall 21 of the furnace. The gas discharge end of the purging plug may terminate a few inches short of the interior surface 22 of forewall 21. The recess 23 thus formed is filled with a refractory material which forms in effect a protective plug 24 for the gas emission end of purging plug 20.

Any suitable material may be used for the purging plug 20 so long as it is sufficiently porous to present substantially no obstruction to the passage of gas therethrough, yet is substantially impervious to the inward penetration of molten metal. The plug may for example be composed of porous silicon carbide or alumina.

The protective plug 24 may be made of any material which is compatible with the melting unit lining. Preferably it is one of the well known types of material which may be applied by gunning. One suitable material which is given by way of example is a periclase gunning mix which includes a high proportion of magnesia. Such a material may be obtained from the Refractories Division of the H. K. Porter Company, Inc. under the trade name Airmag, a typical analysis of which is given below.

| | Percent |
|---|---|
| $Cr_2O_3$ | 1.1 |
| $Fe_2O_3$ | 2.0 |
| $SiO_2$ | 5.5 |
| $Al_2O_3$ | 2.2 |
| $CaO$ | 1.5 |
| $MgO$ | 86.8 |
| $N_2O_3$ | 0.4 |

A purging gas conduit is indicated at 26, said conduit having a valve 27 therein. The valve may be manipulated by handle 28 to a position in which purging gas from a suitable source under pressure is passed through the purging plug, as in FIG. 3, to the closed position of FIGS. 1, 2 and 4.

A vacuum tank is indicated at 31 in FIG. 5, the vacuum in the tank being created by a multi-stage steam ejector indicated generally at 32. Means for creating an agitation within the molten metal which brings remote portions of the metal to the surface where it may be exposed to the vacuum are indicated at 33. In this instance a gas purging system of the type described in my above-mentioned copending applications has been employed. A charge material hopper for the addition of charge materials during the vacuum treatment portion of the cycle is indicated at 34.

In FIG. 6, ladle 30 is shown in a teeming position above ingot mold 36. A post-degassing slag layer is indicated at 37, this layer being added at or near the end of the vacuum treatment for the primary purposes of reducing heat loss by radiation during teeming and pickup of deleterious gases from the atmosphere, all as explained in greater detail in U.S. Pat. No. 3,236,636.

In this instance the degassed steel 38 is being teemed through a protective collar 39 which forms the upper confines of an inert gas shroud. The inert gas is admitted to the teeming colar via conduit 40 from any suitable source.

The use and operation of the invention are as follows:

The steel making process with which the present invention is concerned may commence with the melting unit, in this instance the electric furnace 10, in an empty or charge receiving condition. In this condition porous purging plug 20 is located as shown, and recess 23 is exposed to the interior of the furnace.

Gunning material of the type described above is first filled into recess 23 to form the protective refractory cover 24 of FIG. 2. The refractory cover may be applied in any convenient manner. If the material is capable of being gunned in, it may be applied by a conventional BRI gun. Alternately, the plug 24 may be dispensed with entirely and the emission and of plug 20 placed flush with surface 22. In this event the emission end of plug 20 may be glazed over by the action of the molten steel.

After formation of the protetcive cover 24, which may be formed while the furnace is still relatively hot, a molten charge 25 is formed in the hearth 12. The charge includes a conventional layer of slag 29. It will be understood that any suitable operations may be carried on within the melting unit. Slags may be added and removed as in conventional practice for example.

Refining operations may be carried out toward the end of the furnace cycle. In such operations a good mixing action is desired at the interface between the slag and the molten charge. In order to promote a good mixing action and to effect initial degassing of the charge, valve 27 is turned from its FIG. 2 to its FIG. 3 position and gas admitted through conduit 26 to the porous purging plug 20. The pressure of the gas will blow the protective refractory cover 24, if one is employed, out of recess 23. The cover will float to the surface since it has a lesser specific density than the molten charge. As the purging gas moves upwardly it will create a circulation within the molten metal substantially as indicated by the arrows in FIG. 3. Any suitable purging agent may be employed. Helium and argon or any other readily available inert gas may be employed, all as more full described in U.S. Pat. No. 3,236,635. Reactive gases such as CC14 may be employed to hasten dehydrogenation and prevent oxygen build-up. The circulation creates an agitation and turbulence within the molten metal which promotes a good metal-slag interface mixing action, thus speeding the refining process. At the same time the slag is caused to be pushed away from the area adjacent the discharge spout 17 and a substantially slag free area 29a is formed. The formation of the substantially slag free area will of course depend to a great extent upon the location of the purging plug 20, and it is preferred that the plug be located in the area beneath the discharge spout so that the slag free area is formed immediately at the inner side of the spout.

The agitation caused by the purging gas will also promote intermixing of charge materials, including alloy materials, which are added to the furnace. In a conventional practice furnace additions are shoveled through the opening closed by door 16, but occasionally the additions do not thoroughly mix into the charge because of the slag on the surface of the charge and the lack of circulation within the charge. The agitation and turbulence caused by the purging agent ensures that the alloy addition materials are mixed throughout the charge.

It will be appreciated that the purging gas can be admitted during the refining operations or subsequent thereto. Preferably, the refining and purging are carried on substantially simultaneously so that the furnace treatment time may be decreased.

If desired, gas may be bubbled upwardly through the charge during melt-down. Large pieces of solid scrap resting on the bottom of the furnace are usually the last to melt since they are farthest from the electric arcs. By creating a circulation of the hot, molten portion of the charge about the solid scrap the scrap is melted at a faster rate, thus shortening melt-down time.

Furthermore, gas may be purged at the appropriate time to expedite slag treatment. In a double slag process in which both slags are completely removed prior to tapping, the gas may be bubbled upwardly shortly before removal of the first and/or second slags, thereby piling the slag against the rear wall as shown in FIG. 3. This will materially reduce the time and effort needed to slag off.

It will further be understood that purging under atmospheric pressure will remove substantial quantities of deleterious gases from the charge, and thereby reduce the quantity of gases which must be removed later in the cycle during the vacuum treatment. It appears as of now, however, that the clean, flake free steels demanded today by industry cannot be produced by atmospheric degassing alone.

After the furnace reactions have proceeded to the desired point, valve 27 is closed and the furnace tilted to the FIG. 4 position for pouring into ladle 30. By maintaining the passage of purging gas through plug 20 up to the moment of tilting, or even during the tilting movement, the initial flow of metal through discharge spout 17 will be substantially slag free. As soon as the furnace is tilted to the point shown in FIG. 4 all of the slag will be above the inner end 17a of the tap hole and accordingly the charge will be drained from the furnace at a point beneath the slag line. As a consequence only slag free metal will be tapped into ladle 30.

After the metal has been tapped from the furnace, the slag may be disposed of at leisure.

The substantially slag free metal in ladle 30 may then be transferred to a vacuum treatment station, such as that illustrated and described in FIG. 5 and the treatment steps described in my copending application carried out. It will be noted that metal which is substantially slag free is desired in the degassing processes described in those applications, and, by virtue of the above described furnace treatment, such slag free metal is provided.

One great advantage of the above-described process is that a portion of the degassing operation may be carried out at that point in time in the cycle at which heat may be most easily added to the metal. In a conventional process wherein degassing does not begin until after the metal has been tapped, the temperature will continuously fall with the passage of time unless relatively expensive ladle or vacuum heating devices are employed to slow, or arrest, the temperature drop. In the present process degassing may be partially completed even before the metal reaches tapping temperature. Should the preliminary atmospheric pressure degassing in the melting unit tend to lower the temperature, additional heat may be added from the heat source in the melting unit, which is the most convenient and inexpensive heat source.

Once in the vacuum treatment tank, the vacuum treatment time can be materially reduced over the time formerly required because the included deleterious gas content of the metal in the ladle at the commencement of vacuum tank operations is considerably lower than it normally is when no furnace purging has taken place. As a result the low vacuums currently used in the art, that is from about fifty microns to about two thousand microns Hg, may be reached much quicker. The included deleterious gas content of the metal may be carried down to the desired limits sooner than in conventional practice and the vacuum treatment time thereby shortened. Since each minute of vacuum tank time saved is equal to roughly a savings of seven degrees Fahrenheit temperature loss, it can be appreciated that even a savings of five or six minutes treatment time will require only an insignificant amount of super heat in the furnace as contrasted to present superheats of from sixty to eighty degrees Fahrenheit.

Alternately, or concurrently, smaller ejectors may be employed in the vacuum unit which is a great advantage when large quantities of steam and water are not readily available.

After treatment in the vacuum tank the molten metal may be teemed either in atmosphere or under an inert gas shroud as shown in FIG. 6.

It should also be understood that whereas the use of a gas has been described as the usual degassing expedient in the absence of a vacuum (and also in the presence of a vacuum) the invention is not so limited. The invention, in its broadest aspect, contemplates a first or pre-degassing action which preferably, though not necessarily, is carried out at substantially atmospheric pressure, usually in the melting unit, followed by a second degassing action which is carried out in the presence of a vacuum.

For example a tapping ladle may be outfitted with means for agitating molten metal therein such as an induction stirring coil or a purging attachment. An agitation could be imparted to the molten metal after tapping, either while the ladle is stationary or while it is in transit to a vacuum degassing station. If desired the agitation may be maintained up to, or even through, the moment of closure of the vacuum tank. This atmospheric pressure degassing would remove large quantities, and possibly the major portion, of the included deleterious gases.

The second, or finish degassing phase of the invention contemplates exposure of the molten metal to vacuum levels low enough to provide a driving force tending to cause the gases within the metal to be removed and drawn off through the vacuum system. The vacuum alone may be relied upon to lower the gas level to a desired value, particularly if a relatively shallow receptacle is employed. If desired the metal, while subjected to the vacuum, may be agitated, as by an induction stirring coil or the passage of a gaseous purging agent upwardly through the metal starting from either a gaseous or non-gaseous form. If desired, the carbon deoxidation, alloy addition, or heat addition procedures described in the above-mentioned U.S. patents, and Pats. Nos. 3,501,289 and 3,501,290 may be employed.

It will also be understood that sensible heat may be added at times in the cycle other than just in the melting unit. The term "sensible heat" as used in this specification is intended to refer to quantities of heat of sufficient magnitude to affect the rate of heat loss from the molten metal. Such expedients as electric arc heating are contemplated as contrasted to the negligible heat addition resulting from the use of induction stirring coils.

From the foregoing it will at once be understood that the invention may be practiced with variations which are obvious to those having ordinary skill in the art. Accordingly the scope of the invention should be limited not by the scope of the aforegoing exemplary description but solely by the scope of the hereinafter appended claims.

I claim:

1. A steelmaking process comprising the steps of melting cold scrap in an electric furnace having a porous plug protected by a separable, refractory, self-sustaining cover member adjacent the tapping spout by arc heat to form a molten metal charge, removing substantial quantities of included deleterious gases from the metal charge in the furnace by removing the self-sustaining cover member from the porous plug, threafter passing a purging gas which is inert with respect to the molten metal charge upwardly through said porous plug and the charge under substantially atmospheric pressure and in the presence of arc heat whereby the charge is degassed, moving the slag away from the tapping spout area by the circulation set up by the purging gas, and tapping degassed molten metal from the furnace under the slag into a ladle whereby mixture of metal and slag during tapping is minimized.

2. In the steelmaking process of claim 1, the further step of adding alloying material to the charge prior to termination of the circulation within the charge.

3. A steelmaking process comprising the steps of melting cold scrap in an electric furnace having a porous plug protected by a separable, refractory, self-sustaining cover member adjacent the tapping spout by arc heat to form a molten metal charge, removing substantial quantities of included deleterious gases from the metal charge in the furnace by removing the self-sustaining cover member from the porous plug, thereafter passing a purging gas which is inert with respect to the molten metal charge upwardly through the porous plug and charge under substantially atmosphere pressure and in the presence of arc heat whereby the charge is pre-degassed, moving slag away from the tapping spout area by the circulation set up by the purging gas, tapping pre-degassed molten metal from the furnace under the slag into a ladle whereby mixture of metal and slag during tapping is minimized, and thereafter finish degassing the pre-degassed molten metal by subjecting it to a vacuum sufficiently low to degas it in a vacuum chamber while passing a purging gas upwardly through the metal from a porous plug in the ladle, whereby vacuum degassing chamber time, and consequently heat loss, is minimized.

References Cited

UNITED STATES PATENTS

| | | | |
|---|---|---|---|
| 1,763,248 | 6/1930 | Moore | 266—34 P P |
| 2,828,516 | 4/1968 | Black et al. | 266—37 |
| 3,501,290 | 3/1970 | Finkl et al. | 75—10 R |
| 2,993,780 | 7/1961 | Allard | 75—49 |
| 3,469,740 | 9/1969 | Crowe | 266—34 P P |
| 2,956,794 | 10/1960 | Allard | 266—34 P P |
| 3,340,925 | 9/1967 | Woodburn, Pr. | 164—281 |
| 2,068,785 | 1/1937 | Bain et al. | 75—49 |
| 3,060,015 | 10/1962 | Solders et al. | 75—49 |

FOREIGN PATENTS

| | | | |
|---|---|---|---|
| 168,152 | 2/1954 | Australia. | |
| 927,827 | 6/1963 | Great Britain | 266—34 |
| 927,827 | 8/1960 | Great Britain | 266—34 V |
| 1,048,895 | 11/1966 | Great Britain | 266—34 |

L. DEWAYNE RUTLEDGE, Primary Examiner

M. J. ANDREWS, Assistant Examiner

U.S. Cl. X.R.

75—49